United States Patent [19]
Freads et al.

[11] 3,774,939
[45] Nov. 27, 1973

[54] LOAD RESTRAINING CROSSBAR

[76] Inventors: Warren L. Freads; Daniel L. Jensen, both of c/o Union Pacific Railroad Company, 1416 Dodge St., Omaha, Nebr.

[22] Filed: Sept. 16, 1971

[21] Appl. No.: 181,104

[52] U.S. Cl. ........................... 280/179 B, 105/369 B
[51] Int. Cl. .............................................. B60p 7/08
[58] Field of Search ................... 280/179 B, 179 R; 105/369 B; 211/1.3, 96, 105.6

[56] References Cited
UNITED STATES PATENTS

| | | | |
|---|---|---|---|
| 1,637,748 | 8/1927 | Harmon | 105/369 B |
| 3,017,841 | 1/1962 | Miller | 105/369 B |
| 3,151,571 | *10/1964 | Heard | 105/369 B |
| 3,038,417 | 6/1962 | Waller | 105/369 B |
| 3,217,664 | 11/1965 | Aquino et al. | 280/179 R X |
| 2,575,550 | 11/1951 | Fahland | 105/369 B |
| 3,078,813 | 2/1963 | Rolfe, Jr. | 280/179 B X |

*Primary Examiner*—Kenneth H. Betts
*Assistant Examiner*—David M. Mitchell
*Attorney*—Austin P. Dodge et al.

[57] ABSTRACT

A crossbar for restraining lading in a transport vehicle. A slide is pivotally connected to one end of the bar. The slide is movable along a guide rail which extends horizontally along one side wall of the cargo space. Means are provided which prevent removal of the slide from the guide rail. A second rail extends along the opposite wall of the cargo space. In active position the bar extends across the cargo space between the two rails. A latch bolt is mounted in each end of the bar and in active position each bolt is received in a selected one of a series of apertures formed in the corresponding rail. The bar may be swung to a storage position in which it lies along the side wall of the cargo space.

3 Claims, 7 Drawing Figures

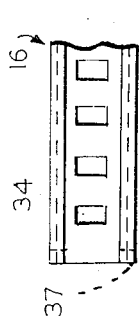
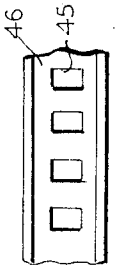
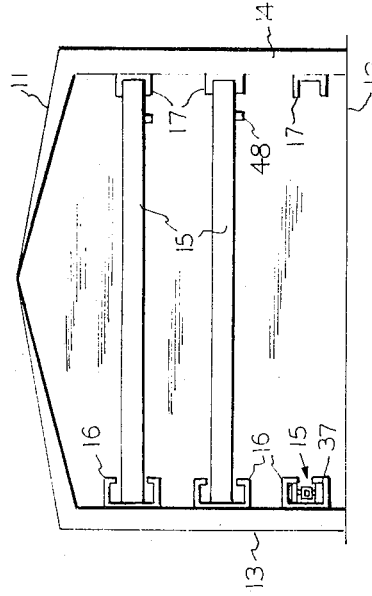
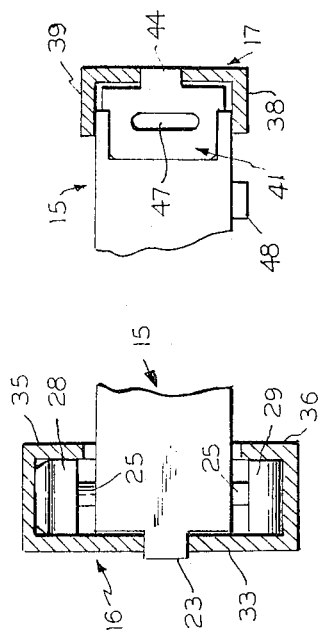
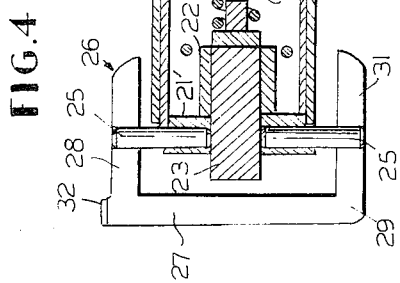
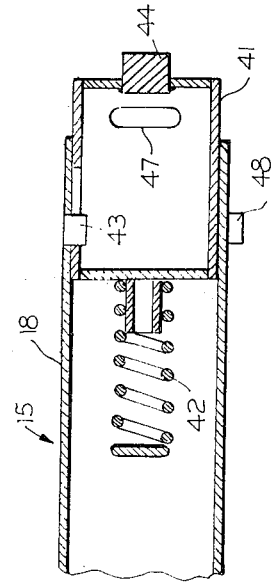
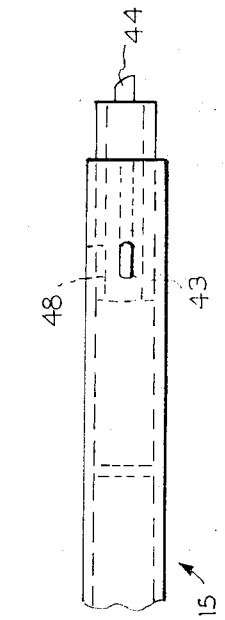
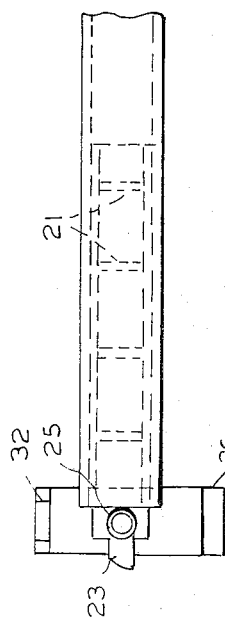
INVENTORS
WARREN L. FREADS
DANIEL L. JENSEN

LOAD RESTRAINING CROSSBAR

BACKGROUND OF THE INVENTION

Load-restraining crossbars of various forms have been used extensively in vehicle cargo spaces. These bars are commonly removable from the cargo space and are subject to loss and pilferage. The utility of the vehicle is greatly reduced if the bars are missing, and their replacement is a source of considerable expense. While means have been proposed in the past which are effective to prevent removal of the bar from the vehicle, such schemes have limited the utility of the bars in service by interfering with their positioning in the car and hampering their adjustment.

THE INVENTION

The cross bar which is the subject of this invention overcomes the shortcomings of the prior art, non-removable crossbars.

The new crossbar in active position extends between two rails. The crossbar carries at one end a slide which is pivotally connected thereto. The slide is slidable along a guide rail when the latches, provided at the opposite ends of the crossbar, are released. The latches comprise bolts which are reciprocable longitudinally of the bar and spring-biased so as to project beyond the ends of the bar. A series of bolt receiving apertures is formed in each rail and serves to hold the bar in active position. The latch bolt at the end of bar which is remote from the pivot can be manually retracted so the bar can be swung out of active position and away from the load. The latch at the pivoted end of the bar need not be manually actuated and is withdrawn from the aperture in the guide rail as an incident to the bar's being swung from load-restraining position to storage position.

Each bolt is preferably formed with a cam surface which engages an edge of the aperture in which it is received. If the bar, having both latches engaged, is pushed toward the load these cam surfaces will cause the bolts to be retracted so that the bar may be moved toward the load. This permits a final adjustment of the bar's position. In cases where the bar must withstand loads from both sides the latch bolts will not be provided with camming surfaces.

The preferred embodiment of the invention will be described with reference to the accompanying drawing.

FIG. 1 is a vertical axial sectional view of the bar, showing the slide in the position it assumes relatively to the stored bar.

FIG. 2 is plan view of the bar but showing the slide in the position it assumes relatively to the bar in active position.

FIG. 3 is a detail view showing the slide mounted in its guide rail.

FIG. 4 is a detail view showing the swinging end of the bar latched to the other rail.

FIG. 5 is diagrammatic showing of a transverse section of a cargo space equipped with the invention looking toward an end wall of the cargo space.

FIG. 6 is an elevation showing one end of the guide rail.

FIG. 7 is an elevation of a portion of the other rail.

Refer first to FIG. 5. The cargo space of a vehicle, such as a freight car, has top, bottom and side walls 11, 12, 13 and 14 as indicated. Load restraining bars 15 extend between horizontal rails 16 and 17 mounted on the side walls 13 and 14. The bars 15 may be latched in place in the active position shown in FIG. 5 or may be unlatched and swung to a storage position lying within rail 16.

As best shown in FIGS. 1 and 2 bar 15 comprises a metallic tubular housing 18 having a rectangular cross-section. An end-piece 19 is secured in the left-hand end of housing 18 by rivets 21. A central bolt guideway 22 is formed in the face 21' of the end piece 19. A bolt 23 is reciprocable along guideway 22 and biased outward by a spring 24. A pair of vertical pintles 25 are secured to the end face 21'. A slide 26 is pivotally connected to bar 15 by pintles 25. Slide 26 includes an upright 27 and upper and lower feet 28 and 29. Lower foot 29 has a long bearing face 31 which engages the lower bearing face of guide rail 16 (see FIG. 3). The upper foot 28 has a short bearing face 32 which engages the upper bearing face of guide rail 16.

Guide rail 16 comprises a vertical web portion 33 provided with openings 34 (see FIG. 6) and upper and lower channel portions 35 and 36. The legs of channels 35 and 36 prevent lateral removal of the slide 26. An end plate 37 prevents endwise removal of slide 26 from an open end of rail 16 such as might exist near a door opening in the side wall of the cargo space. This plate 37 is positioned so that the bar, even in the storage position, is not engaged thereby. In this way the slide 26 may be moved to the end of rail 16 even when the bar is in the stored position.

Rail 17 is of channel form. Legs 38 and 39 span the end of bar 15 and hold it against vertical movement. A sliding bolt structure is mounted in the right hand end of bar 15. It includes slide portion 41 received in housing 18. A spring 42 biases the slide portion 41 outward, a stop 43 preventing its escape. A bolt 44 projects from the outer end of slide portion 41 and this bolt 44 is received in keeper aperture 45 in the web 46 of rail 17. Hand holes 47 are provided so that bolt 44 can be retracted.

A latch boss 48 is provided on lower edge of bar 15. This boss engages behind the outer leg 36 of channel 16 when the bar is swung into stored position. The bar is thus retained in storage position. To release this latch the end of bar 15 may be raised, rocking about slide 26, sufficiently for the latch boss 48 to swing clear of the leg of channel 36.

USE OF THE INVENTION

When the bar 15 is swung away from the load for storage it will lie within the guide rail 16 as shown for the lowermost rail in FIG. 5. The end carrying slide 26 is nearer the end wall than the free end of bar 15 when the bar is in stored position. The projection 48 will be engaged behind legs 36. When the bar is to be swung to active position, the free end is lifted so that lug 48 will swing clear. The bolt 23 at this time may or may not be positioned so as to enter an aperture 34. If it is not so alined, this bolt will engage the web 33 and be retracted. Slide portion 41 and bolt 44 will strike the web of rail 17 and be retracted. The bar may be pushed toward the load, and the bolts 23 and 44 will be projected outward in the apertures 45 and 46. Even after the bolts are engaged in apertures 45 and 46 the bar may be moved further toward the load by pushing it in that direction. The rounded bolt surfaces will serve as cams and cause retraction of the bolts freeing the bar for further movement to the next set of apertures.

The bolts can be made with square ends, if the bar must resist loads applied to both faces. In that case the initial position of the slide 26 must be more precise than is the case where the bar can be pushed toward the load with automatic bolt retraction.

Since the bar is supported by guide rail 16, it is unnecessary for the user to carry the bar once the slide 26 is in place.

We claim:

1. For use in the cargo space of a vehicle the combination of:
   a. a channel-shaped guide having its web portion adapted for connection to and extension along a wall of said space.
   b. a slide movable along said guide and captive therein;
   c. a rail parallel with said guide and adapted to extend along an opposed wall of the space
   d. a pivot on said slide within the guide and having its axis transverse to the direction of slide movement and parallel with said web portion;
   e. a bar connected by said pivot to said slide so as to swing between a storage position in which it lies along said guide and an active position in which it extends between and is supported by the guide and the rail;
   f. a longitudinal series of bolt receiving apertures formed in the web portion of the guide and extending longitudinally therealong
   g. a series of bolt receiving apertures formed in the rail and extending longitudinally therealong;
   h. bolt members at each end of the bar, extending longitudinally therealong, one bolt yieldingly biased so as to enter an aligned aperture in the guide and the other bolt yieldingly biased so as to enter an aligned aperture in said rail when said bar is in active position; and
   i. actuator means whereby one of said bolts may be withdrawn against said bias from an aperture in which it has been received.

2. The combination defined in claim 1 in which:
   a. each bolt includes a curved surface serving as a cam to withdraw the bolt from an aperture in which it is received when the bar is in its active position and propelled along said rail and guide in a direction to cause engagement between said surface and the side of that aperture.

3. The combination defined in claim 1; and
   a. means to latch said bar in storage position.

* * * * *